Patented Apr. 24, 1934

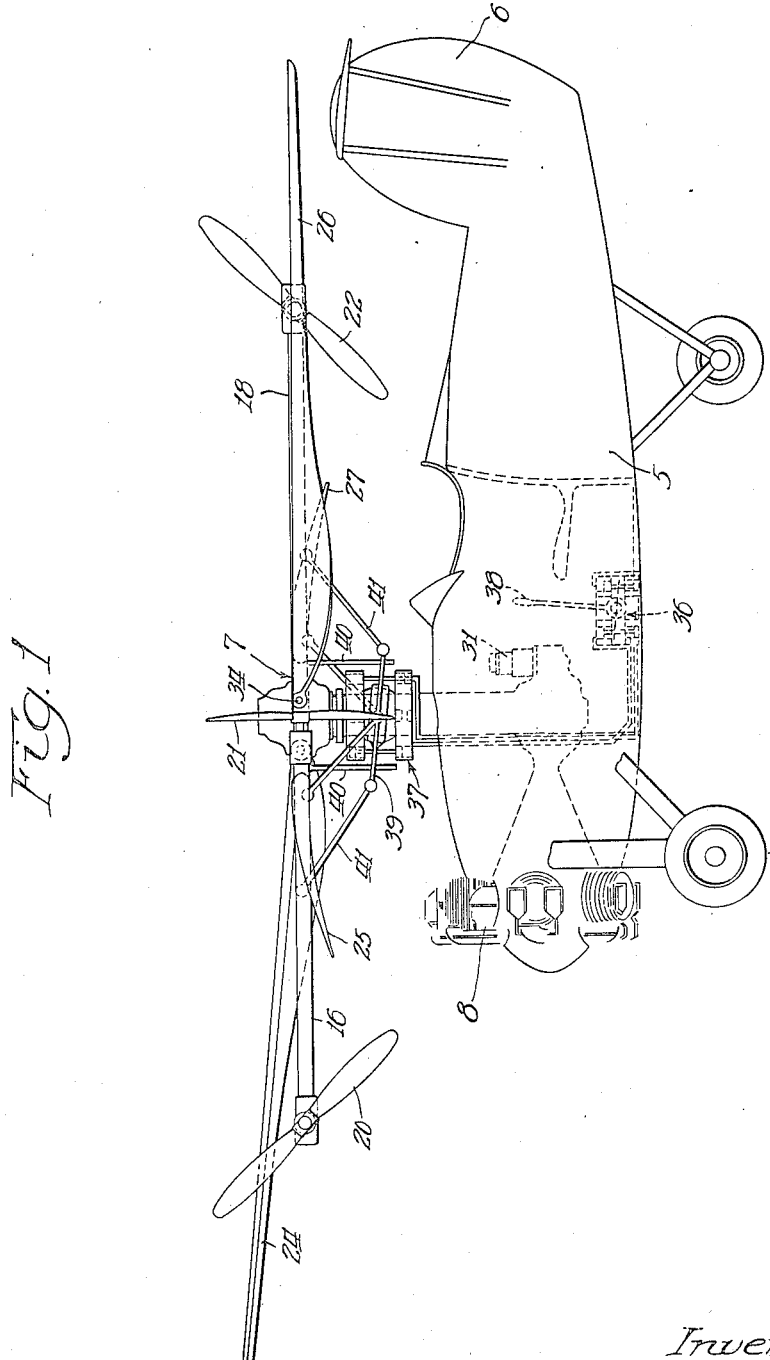

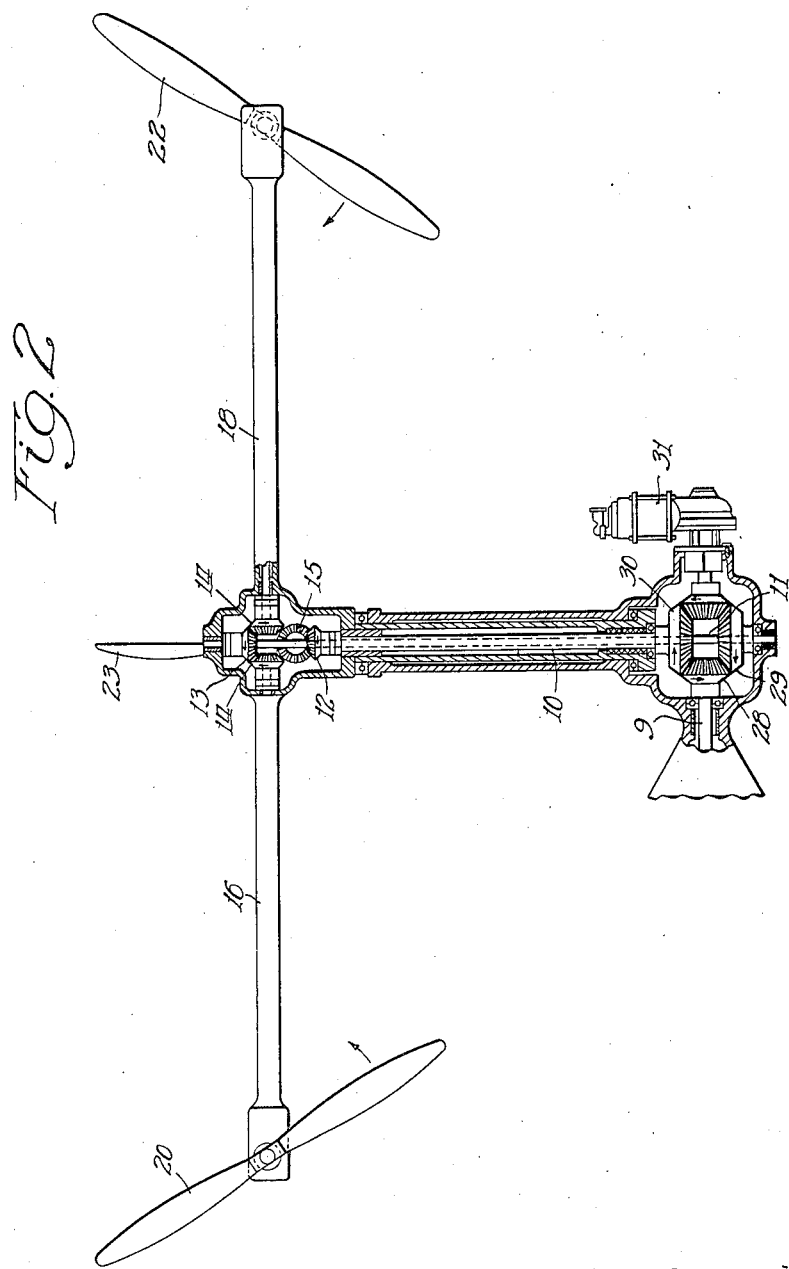

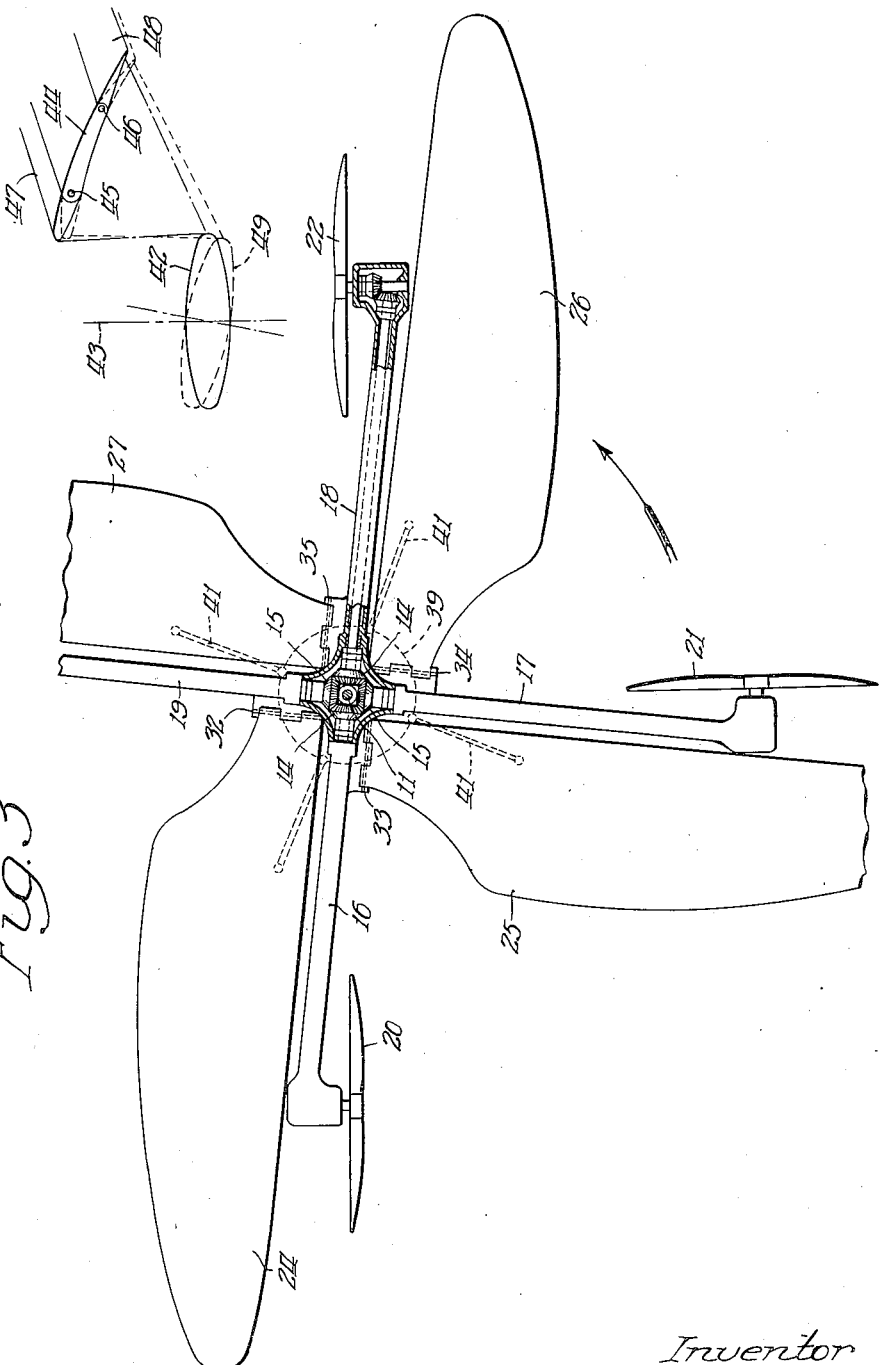

1,955,921

UNITED STATES PATENT OFFICE 1,955,921

AIRCRAFT CONTROL

Frederick C. Kusse, Chicago, Ill.

Application October 8, 1931, Serial No. 567,655

4 Claims. (Cl. 244—19)

My invention relates to aircraft control and more particularly to a craft of the helicopter type wherein a lifting airscrew is utilized to provide the lift necessary for elevating and sustaining the craft.

One of the principal purposes of this invention is to provide a means for balancing the torque of the engine or prime mover so as to prevent rotation of the body of a helicopter in which only a single lifting airscrew is utilized.

In devices of this character, the airscrew is usually mounted above the body, and, if the engine is located on the body, a transmission of power to the airscrew produces a torque in rotating the vertical shaft tending to rotate the body of the device about a vertical axis. Various means have been employed to overcome this difficulty such as using a pair of balanced airscrews driven in opposite directions or some aerodynamic means such as a laterally directed propeller on the body.

In the type using a single lifting screw, so far as I am aware, all methods for balancing the torque where the motor is in the body have been aerodynamic. Such systems have serious difficulty in that they create a waste of power and also are difficult to so adjust as to provide complete stability for all speeds of the airscrew.

With the present invention, the balancing is obtained in a manner which prevents any appreciable loss of power, and the balancing is taken care of in such a fashion as to eliminate the necessity of aerodynamic equipment for this purpose.

It is also a further object of this invention to provide in a device of this character a novel means for obtaining slippage for horizontal movement through the adjustment of the lifting screw.

Other and more specific objects of the invention will appear as the description proceeds in connection with the accompanying drawings wherein the preferred form of the invention is shown. It is to be understood, however, that the drawings and description are illustrative only and are not to be taken as limiting the invention except in so far as it is limited by the claims.

In the drawings—

Fig. 1 is an assembled view of a heavier than air machine embodying my invention;

Fig. 2 is a vertical sectional view through the driving mechanism for the lifting screw the lifting vanes and their control elements being left off for the purpose of more clearly illustrating the other parts;

Fig. 3 is a top plan view partly in section illustrating the airscrew and its driving propellers: and Fig. 4 is a diagrammatic view illustrating a slightly different manner of producing horizontal translation by slippage.

Referring now in detail to the drawings, I might say first that this device is an improvement over the device shown in my copending application Serial No. 488,309, filed October 13, 1930, for improvements in aircraft. The control mechanism for operating the vanes of the airscrews is substantially the same as that shown in my prior application and is only shown herein in a general way in order to make the operation of the other elements more clearly understandable.

In the drawings, the numeral 5 refers to the body or fuselage of the machine. The machine is provided with a stabilizer at 6 preferably above the level of the body and lying very close to the plane of the lifting screw referred to generally by the numeral 7. The body is equipped with a suitable engine 8 or other prime mover which is connected through suitable drive shafts such as 9, 10, and 11 to rotate the driving gears 12 and 13 which are located substantially at the hub of the lifting screw. These driving gears in turn each drive a pair of gears such as indicated at 14 and 15 to operate shafts guided in the propeller supporting arms 16, 17, 18, and 19. These shafts in turn drive the propellers 20, 21, 22, and 23.

The propellers are really the means for producing rotation of the airscrew and are located in front of the vanes 24, 25, 26, and 27, respectively. These propellers are preferably arranged in pairs disposed directly opposite each other on a line through the axis of rotation of the airscrew so as to obtain the maximum efficiency therefrom. It will be seen that as the propellers are rotated they will cause a rotation of the lifting vanes in the direction indicated by the arrow in Fig. 3 and thus create the lifting force necessary to lift the craft from the ground and maintain it at the desired level.

One difficulty which has seriously impared the utility of helicopter devices of this character where the lifting screw is driven by propellers lies in the fact that the motor in driving the propellers develops a torque upon the vertical driving shaft which tends to rotate the craft about the shaft as an axis. In order to avoid this difficulty, the lifting propellers are driven in groups by means of the shafts 10 and 11 as just previously described so that the propellers 20 and 22 for example are driven by shaft 11 while propellers 21 and 23 are driven by shaft 10. These propellers should be matched so that the force necessary to rotate one pair is substantially equivalent to that necessary to rotate the other pair.

The drive shaft 9 is connected as indicated in Fig. 2 by means of the bevelled gears 28, 29, and 30 so that shaft 10 for example rotates in the direction of the arrow on gear 30 while shaft 11 rotates in the opposite direction as indicated by the arrow in gear 29 with the drive shaft as indicated by the arrow in gear 28.

The torque caused by the drive shaft rotating gear 30 has a tendency to turn the body of the aircraft in a clockwise direction as viewed from the top, that is to say, to swing the nose to the right. On the other hand, however, the torque on the gear 29 is delivered in the opposite direction and tends to cause the body to swing in a counterclockwise direction. Owing to the balancing of the propellers, these two forces are substantially equal and therefore neutralize each other so that the horizontal turning of the machine due to the engine torque is eliminated.

It is believed to be clear from the above description that with this mechanism I am able by the necessary power to rotate the lifting screw without causing a horizontal torque that would tend to swing the body about a vertical axis.

The mechanism shown at 31 is merely a starting mechanism for starting the engine and will not be described further.

Also, for clearness, in the drawings the gears 15 in Fig. 2 are shown much lower than is necessary; in practice they are placed substantially up to the level of gears 14 being just enough lower to avoid contact with gear 13 while being driven by gear 12.

It will be observed that in operation if the propellers 20 and 22 driven by gears 14 and shaft 11 do an amount of work exactly equal to what is done by propellers 21 and 23 driven by shaft 10, then the number of pounds thrust upon gear 29 will equal exactly the number of pounds thrust on gear 30. If gear 28 is rotating as indicated by the arrow and the resistance on gear 30 is greater than on gear 29, then the engine with this gear 28 tends to roll forward on gear 30 toward the observer as viewed in Fig. 2. On the other hand, if the resistance at gear 29 is greater than the resistance on gear 30, then the engine will tend to roll back on gear 29, that is, away from the observer. This offers a positive means to offset all twisting moments acting on the aircraft and tending to rotate the body about a vertical axis.

Besides the above mentioned effect, certain other factors have a turning effect on the aircraft body. The resistance of the bearings is one of these. If for example the device is rotating clockwise, it has a slight tendency to rotate the body of the aircraft along with it in a clockwise direction. Again, if the device is rotating in a clockwise direction, then the air moves in a counterclockwise direction due to the back draft of the propellers and this tends to turn the body of the aircraft in a counterclockwise direction. In this fashion the above two factors tend to offset or neutralize each other.

All twisting moments tending to rotate the aircraft body can be brought to zero by properly apportioning the total propeller load between the gears 29 and 30. That is to say, the loads on these gears can be made to vary to offset the resultant effect of the two factors just mentioned. Since in operation all propellers are advancing at the same rate, then by having for example propellers 20 and 22 driven by shaft 11 slightly smaller than propellers 21 and 23, they would meet less resistance and consequently the torque on 29 would be less than the torque on 30. A slight difference in size between the propellers thus is sufficient to completely offset the twisting tendency due to the excess of either the bearing or wind resistance over each other.

Referring now to the methods of producing slippage, this involves a variable lift air foil control unit with hydraulic control such as shown in my copending application hereinbefore referred to. The wings or vanes 24 to 27 are preferably hinged as indicated at 32, 33, 34, and 35 to permit a periodical vertical angular movement of the wings in synchronism with the rotation of the lifting unit. As in the prior application, the two similar control units 36 and 37 are so arranged that by tilting the stick 38 the control disk 39 is also caused to tilt in a corresponding manner.

The details of the hydraulic control mechanism will not be gone into in this case as it is believed to be sufficient to say that for the purposes of this case the movements of the disk 39 angularly about a spherical center correspond exactly to the movements of the lever 38 about its spherical mounting, the upper and lower hydraulic units being geometrically similar and connected in such fashion as to create this result.

The driving rods such as indicated at 40 cause the control disk 39 to rotate with the lifting screw. The slippage control rods 41 are each connected by universal joints to the control ring 39 and to one of the wings such as 24, 25, 26, or 27. Thus when the control stick 38 is in vertical position, the control disk 39 will be exactly horizontal so that all of the wings make the same angle with the horizontal in this position. These wings preferably extend slightly upwardly toward their free ends. This is the rising and hovering position of the control. In this position, the center of lift of the air screw will correspond to the geometrical center thereof.

By moving the control stick in any direction whatever out of the vertical, the hydraulic system will cause disk 39 to move accordingly. This disk when tilted will cause the setting of the wings relative to the axis of rotation of the lifting unit to be changed due to certain of the wings being lifted and others lowered. The effective angle of attack of the wings is thus caused to vary during each rotation of the unit. This causes the center of pressure of the whole unit to shift from the geometrical center thereof with the result that a horizontal component of force is produced which is manifested in a lateral slippage of the aircrcaft. The direction of this slippage or horizontal translation depends upon the direction of tilt of the control disk 39 which in turn depends upon the direction of tilt of the control lever 38.

By shifting the control lever in the proper direction, that is substantially rearward, the wings may be caused to tilt upward as they pass across the front end for the fuselage thus having their least amount of lift at this point so as to cause a horizontal slippage of the helicopter in the forward direction.

Similarly, the aircraft may be maneuvered to perform right or left turns by causing the point of maximum depression of the control disk to occur at the left or right side of the hub respectively.

A slightly different method for producing the slippage is illustrated diagrammatically in Fig. 4. This is a diagrammatic view in which 42 represents the air foil control disk in normal position rotatable in a plane perpendicular to the axis of rotation 43 of the lifting unit. Member 44 is a section of a wing rotatable about axis 43 with the camber as shown by full lines corresponding to the position 42 of the control disk.

The wing is designed to permit camber variations by vertical oscillations of the leading and trailing edges. This is accomplished by hinging the wings as indicated at 45 and 46 so that the forward portion 47 and the rearward portion 48 may be turned about their hinges. The dotted line positions of the sections 47 and 48 show the effect of tilting the control disk from the position shown at 42 to the position shown at 49. In this fashion, a cyclical variation of the camber of the wings in synchronism with the rotations of the lifting unit may be accomplished and thus cause slippage in a manner similar to that described in connection with Fig. 3.

From the above description, it is believed that the construction and operation of this device will be clear to those skilled in this art and the advantages thereof readily apparent.

Having thus described one specific form of my invention, what I claim as new and desire to secure by Letters Patent is:

1. In aircraft of the helicopter type having an air screw provided with a plurality of driving propellers and having a body provided with a prime mover, and means connecting said prime mover and propellers and balancing the horizontal torque on the body exerted to drive the propellers, said means comprising a pair of concentric vertical drive shafts each connecting certain of said propellers to the prime mover, the connections being such that said shafts are driven in opposite directions under substantially the same torque.

2. In aircraft of the helicopter type wherein a lifting screw rotates about a generally vertical axis to produce the necessary lift for ascension and sustained flight, a power system for driving said screw without producing a horizontal torque tending to rotate the craft about a vertical axis, comprising a prime mover carried by the body of the craft, two groups of propellers movable with said screw and driven from said prime mover, and a pair of upwardly extending driving members each driven from said prime mover and each driving one of said groups of propellers, said members being so arranged that the horizontal torque exerted on one by said prime mover is opposite to the horizontal torque exerted on the other thereby.

3. In aircraft of the helicopter type wherein a lifting screw rotates about a generally vertical axis to produce the necessary lift for ascension and sustained flight, a power system for driving said screw without producing a horizontal torque tending to rotate the craft about a vertical axis, comprising a prime mover carried by the body of the craft, two groups of propellers movable with said screw and driven from said prime mover, and a pair of vertically extending driving members each driven from said prime mover and each driving one of said groups of propellers, said members being driven in opposite directions by said prime mover.

4. In aircraft of the helicopter type having a lifting screw, means for driving said screw from a prime mover in the aircraft body without producing torque tending to rotate the craft about the axis of the screw, comprising a horizontal drive shaft for said prime mover, two upwardly extending transmission shafts driven by said drive shaft in opposite directions, propellers mounted with said lifting screw, and connections from said shafts to said propellers.

FREDERICK C. KUSSE.